(12) United States Patent
Liu et al.

(10) Patent No.: US 10,040,232 B2
(45) Date of Patent: Aug. 7, 2018

(54) LOCKING DEVICE AND MOLD USING SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jun Liu, Shenzhen (CN); Shan-Xue Niu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 403 days.

(21) Appl. No.: 14/836,220

(22) Filed: Aug. 26, 2015

(65) Prior Publication Data

US 2016/0339608 A1 Nov. 24, 2016

(30) Foreign Application Priority Data

May 20, 2015 (CN) .......................... 2015 1 0258720

(51) Int. Cl.
*B29C 33/44* (2006.01)
*B29C 33/20* (2006.01)
*B29C 45/26* (2006.01)

(52) U.S. Cl.
CPC ...... *B29C 45/2602* (2013.01); *B29C 45/2606* (2013.01); *B29C 2045/2604* (2013.01)

(58) Field of Classification Search
CPC ............ B29C 45/2602; B29C 45/2606; B29C 2045/2604; B29C 33/444; B29C 33/202
See application file for complete search history.

(56) References Cited

U.S. PATENT DOCUMENTS 2,419,089 A * 4/1947 Quarnstrom ........ B29C 45/2602
249/205
2,494,777 A * 1/1950 Patterson ................ B29C 45/38
164/262
3,044,121 A * 7/1962 Wiskoff .............. B29C 45/2602
164/347

(Continued)

FOREIGN PATENT DOCUMENTS

CN 201249499 Y 6/2009
JP H10-58454 A 3/1998

*Primary Examiner* — Yogendra N Gupta
*Assistant Examiner* — Emmanuel S Luk
(74) *Attorney, Agent, or Firm* — ScienBiziP, P.C.

(57) ABSTRACT

A locking includes a locking member, a guiding rod, and a space member. The guiding rod is fixedly connected to the locking member. The mold includes a first mold plate, a second mold plate, a stripper plate, and a top plate. The first mold plate, the second mold plate, the stripper plate, and the top plate are connected in sequence. A receiving hole is defined in the first mold board. A through hole is defined in the second mold board corresponding to the receiving hole. The guiding member movably passes through the through hole. The through hole includes a first retaining portion and a second retaining portion. The space member is sleeved on the locking member. A diameter of the space member is greater than that of the receiving hole and the second retaining portion. The disclosure also supplies a mold.

13 Claims, 14 Drawing Sheets

(56) References Cited

U.S. PATENT DOCUMENTS

| | | | | |
|---|---|---|---|---|
| 3,081,494 | A * | 3/1963 | Darnell | B29C 45/2606 249/160 |
| 3,379,239 | A * | 4/1968 | Rusk | B22C 7/06 164/387 |
| 3,426,399 | A * | 2/1969 | Jones | B25B 31/005 24/453 |
| 3,508,299 | A * | 4/1970 | Ahern | B29C 45/38 425/309 |
| 3,572,424 | A * | 3/1971 | Byrne | B29C 45/2602 164/131 |
| 3,724,802 | A * | 4/1973 | Veneria | B29C 45/2602 249/67 |
| 3,749,537 | A * | 7/1973 | Schriever | B22D 17/22 249/205 |
| 3,897,929 | A * | 8/1975 | Hartmann | B29C 45/26 249/105 |
| 3,932,085 | A * | 1/1976 | Horbach | B29C 45/33 249/134 |
| 3,986,805 | A * | 10/1976 | Haines | B29C 45/2602 24/603 |
| 4,174,199 | A * | 11/1979 | Benninghaus | B29C 45/2602 425/195 |
| 4,199,313 | A * | 4/1980 | Bohnenberger | B22C 21/10 164/385 |
| 4,248,583 | A * | 2/1981 | Hedke | B29C 33/202 425/450.1 |
| 4,372,738 | A * | 2/1983 | Black | B29C 33/202 24/603 |
| 4,403,810 | A * | 9/1983 | Bieneck | B29C 33/202 425/589 |
| 4,561,626 | A * | 12/1985 | Black | B29C 33/202 249/118 |
| 4,671,764 | A * | 6/1987 | Hehl | B29C 45/17 425/595 |
| 4,790,739 | A * | 12/1988 | Manfredi | B28B 3/021 425/192 R |
| 4,795,125 | A * | 1/1989 | Boros | B29C 33/04 249/78 |
| 4,828,478 | A * | 5/1989 | Hehl | B29C 45/1756 425/190 |
| 4,971,548 | A * | 11/1990 | Asai | B29C 45/2602 264/328.8 |
| 5,044,921 | A * | 9/1991 | Micelli | A23G 1/21 24/453 |
| 5,314,323 | A * | 5/1994 | Bolles | B29C 45/4005 249/219.1 |
| 5,332,384 | A * | 7/1994 | Abramat | B29C 33/303 249/141 |
| 5,359,764 | A * | 11/1994 | Sasaki | B23P 19/04 164/347 |
| 5,397,231 | A * | 3/1995 | Bald | B23Q 16/021 425/450.1 |
| 5,417,560 | A * | 5/1995 | Kaneishi | B29C 45/1704 264/572 |
| 5,494,435 | A * | 2/1996 | Vandenberg | B29C 45/2602 425/450.1 |
| 6,179,606 | B1 * | 1/2001 | Muller | B29C 45/2602 164/342 |
| 6,325,614 | B1 * | 12/2001 | DiSimone | B29C 45/1743 425/192 R |
| 6,431,852 | B1 * | 8/2002 | Vandenberg | B29C 45/2602 425/450.1 |
| 6,491,512 | B2 * | 12/2002 | Vandenberg | B29C 45/4005 425/444 |
| 6,540,499 | B2 * | 4/2003 | Schneider | B29C 45/2675 425/190 |
| 6,558,145 | B2 * | 5/2003 | Wieder | B29C 45/2606 425/107 |
| 7,001,173 | B1 * | 2/2006 | Chu | B29C 33/303 384/30 |
| 7,258,539 | B2 * | 8/2007 | Lowe | B29C 45/1743 425/192 R |
| 7,381,041 | B2 * | 6/2008 | Wilber | B29C 33/44 425/116 |
| 7,585,001 | B2 * | 9/2009 | Rose | F16L 37/086 285/305 |
| 7,674,106 | B2 * | 3/2010 | Chiu | B29C 33/304 425/190 |
| 8,038,425 | B2 * | 10/2011 | Starkey | B29C 45/2602 425/171 |
| 8,038,426 | B2 * | 10/2011 | Starkey | B29C 45/2602 425/171 |
| 8,070,479 | B2 * | 12/2011 | Chang | B29C 33/0061 425/441 |
| 8,365,383 | B2 * | 2/2013 | Makins | B29C 33/305 29/426.1 |
| 8,371,016 | B2 * | 2/2013 | Li | B29C 45/17 29/525.01 |
| 8,585,337 | B1 * | 11/2013 | Dang | H01R 13/74 411/347 |
| 8,602,769 | B2 * | 12/2013 | Tseng | B29C 45/17 425/451.9 |
| 9,140,280 | B2 * | 9/2015 | Martellotti | B65H 75/22 |
| 9,486,942 | B1 * | 11/2016 | VanDyk | B29C 33/303 |
| 9,770,858 | B1 * | 9/2017 | VanDyk | B29C 33/303 |
| 2002/0018827 | A1 * | 2/2002 | Yasuda | B29C 45/2606 425/552 |
| 2002/0106420 | A1 * | 8/2002 | Vandenberg | B29C 45/2602 425/556 |
| 2006/0163762 | A1 * | 7/2006 | Gabriel | B23B 51/0081 264/2.7 |
| 2007/0290119 | A1 * | 12/2007 | Cerniglia | B29C 45/17 249/67 |
| 2008/0095879 | A1 * | 4/2008 | Tu | B29C 33/303 425/451.9 |
| 2008/0308710 | A1 * | 12/2008 | Yu | B29C 45/2602 249/68 |
| 2009/0263528 | A1 * | 10/2009 | Cerniglia | B29C 45/2602 425/130 |
| 2009/0269434 | A1 * | 10/2009 | Starkey | B29C 45/2602 425/542 |
| 2010/0178376 | A1 * | 7/2010 | Chang | B29C 33/0061 425/556 |
| 2010/0278953 | A1 * | 11/2010 | Ni | B29C 45/14688 425/150 |
| 2012/0107442 | A1 * | 5/2012 | Starkey | B29C 33/301 425/451.9 |
| 2014/0242211 | A1 * | 8/2014 | Kim | B29C 45/2673 425/556 |
| 2016/0067897 | A1 * | 3/2016 | Kintzinger | B29C 45/2602 425/556 |

\* cited by examiner

LOCKING DEVICE AND MOLD USING SAME

FIELD

The subject matter herein relates generally to molds, particularly to a locking device and a mold using the locking device.

BACKGROUND

In injection molds, a locking device to assure that a process for a mold opening and closing operation in proper order, and cooperative with an external puller rod or an elastic member. The locking device usually has a complex structure and is capable of seizing much room in the injection molds.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a mold. The mold can include a first mold plate defining a receiving hole, a second mold plate, a stripper plate, and a top plate. The second mold plate can clamp with the first mold plate. The second mold plate can define a through hole corresponding to the receiving hole. The through hole can include a first retaining portion and a second retaining portion flow communicating with the first retaining portion. The first retaining portion can be located adjacent to the first mold plate. A diameter of the first retaining portion can be greater than a diameter of the second retaining portion.

The stripper plate can be positioned adjacent to the second mold plate away from the first mold plate; the second mold plate can be positioned between the stripper plate and the first mold plate. The top plate can be coupled to the stripper plate away from the second mold plate. The stripper plate can be positioned between the top plate and the stripper plate. The locking device can movably pass through the first mold plate and the second mold plate. The locking device can include a locking member, a guiding rod, and a space member. The locking member can be movably received in the receiving hole. The guiding rod can be coupled to the locking member with one end; the guiding rod can through the first retaining portion and the second retaining portion away from the locking member. The space member can be sleeved on the locking member and positioned adjacent to the guiding rod, a diameter of the space member can be less than the first retaining portion but greater than a diameter of an opening the second retaining portion. The lever assembly can movably pass through the first mold plate, the second mold plate, the stripper plate, and the top plate. The first mold plate can be is moved towards the second mold plate, the locking member and the guiding rod are brought to move towards the top plate when in a mold closing operation, the first mold plate and the second mold plate keep moving until the space member contacting an end wall of the first retaining portion, such that a partial portion of the guiding rod is exposed out of the through hole to push the stripper plate closing with the top plate.

Figure 1:
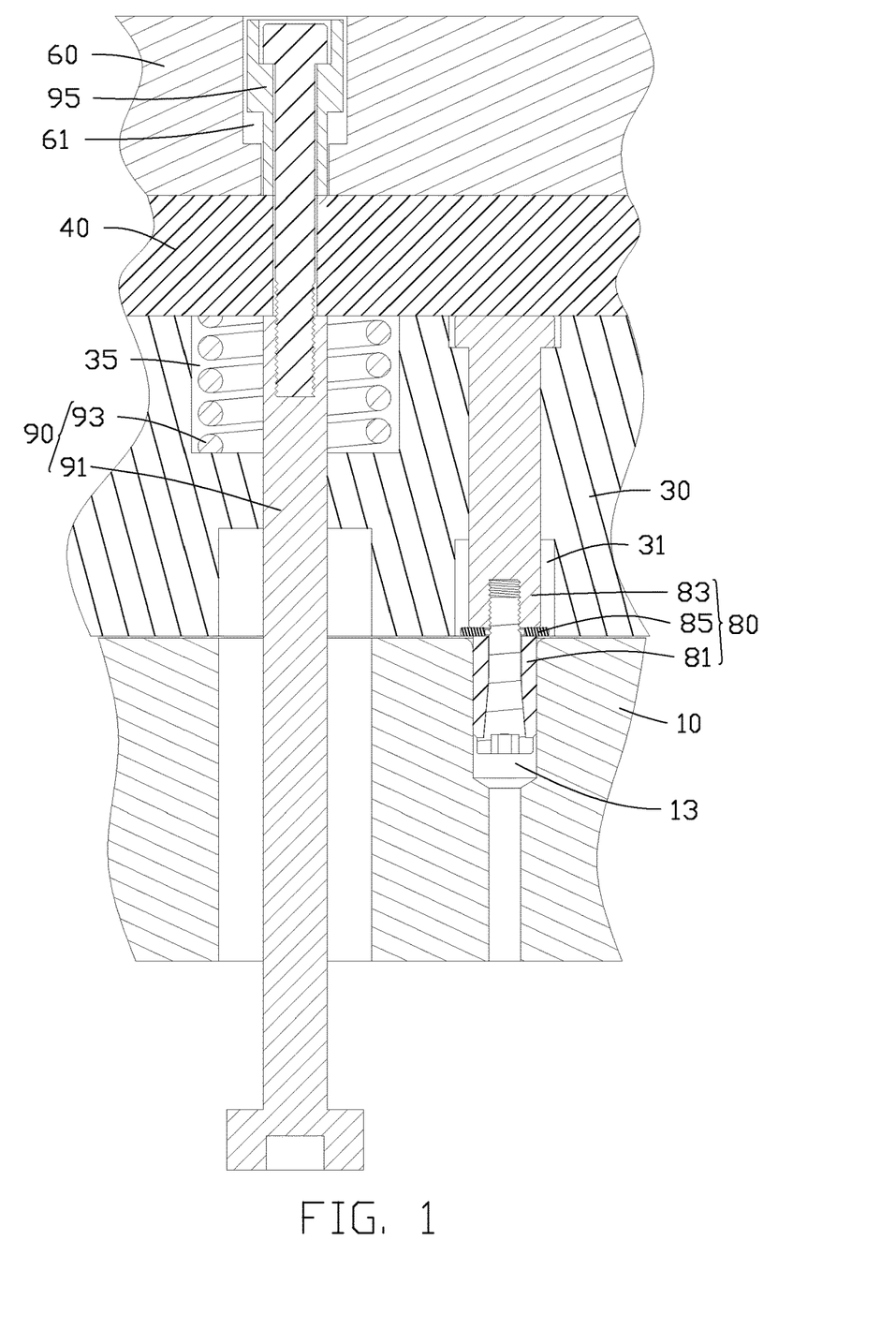
FIG. 1 is a partial cross-sectional view of a first embodiment of a mold including a first mold plate, a second mold plate, a stripper plate, a top plate, a locking device, and a lever assembly.

FIG. 1 illustrates a mold 1. In an illustrated embodiment, the mold 1 can be a three-plate structure. The mold 1 can include a first mold plate 10, a second mold plate 30, a stripper plate 40, a top plate 60, a locking device 80, and a lever assembly 90. The locking device 80 can movably pass through the first mold plate 10 and the second mold plate 30, to assure a process for a mold locking operation in proper order. The lever assembly 90 can pass through the first mold plate 10, the second mold plate 30, the stripper plate 40, and the top plate 60. In the illustrated embodiment, the first mold plate 10 can be a male die, and the second mold plate 30 can be a female die.

The first mold plate 10 can define a receiving hole 13. A round angle 130 can be formed on a top edge of sidewall of the receiving hole 13 adjacent to the second mold plate 30 for preventing the locking device 80 from damage.

Figure 2:
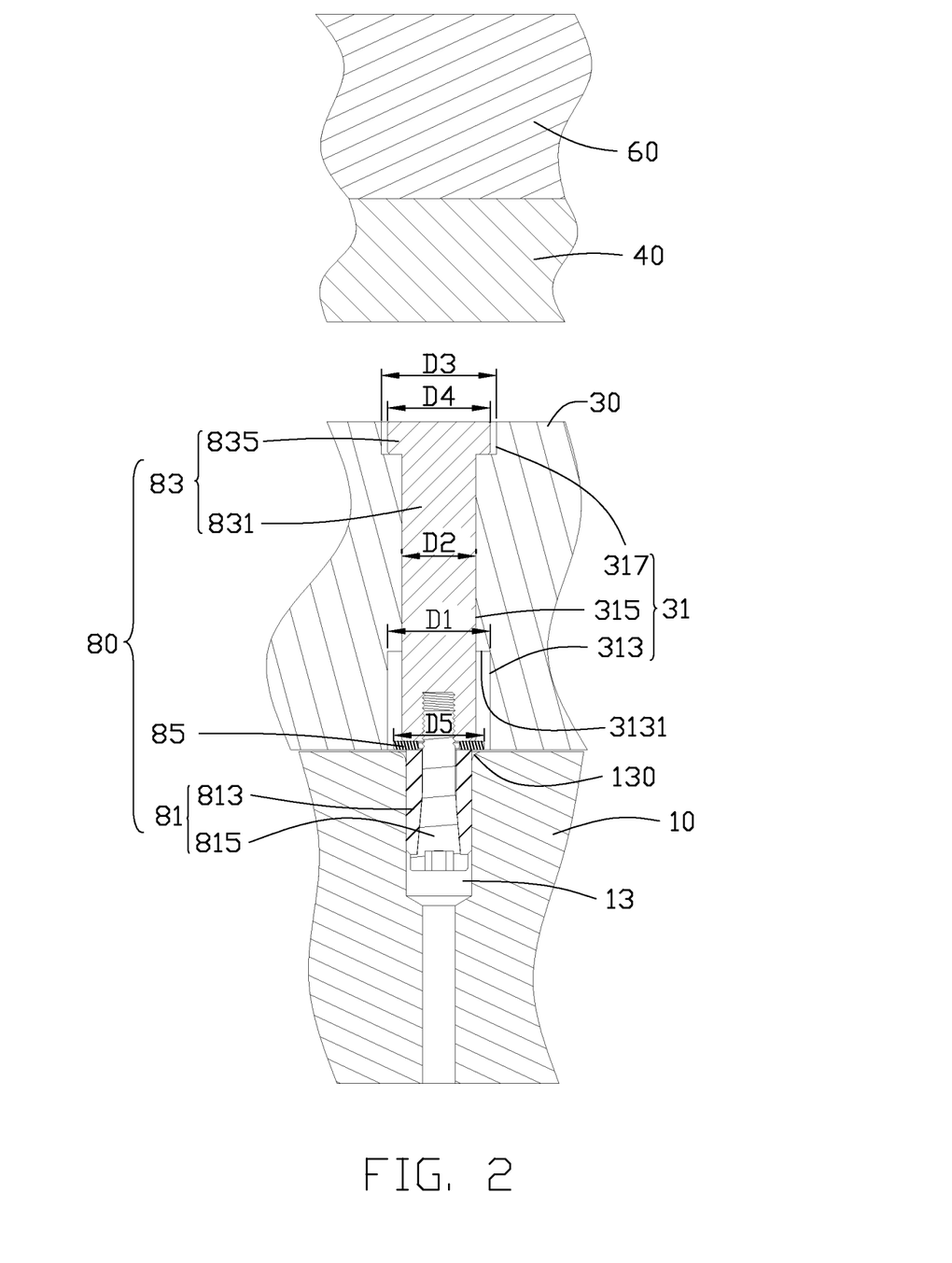
FIG. 2 is a partial cross-sectional view of the mold shown in FIG. 1 for a state that the second mold plate being moved together with the first mold plate during opening the mold.
Figure 7:
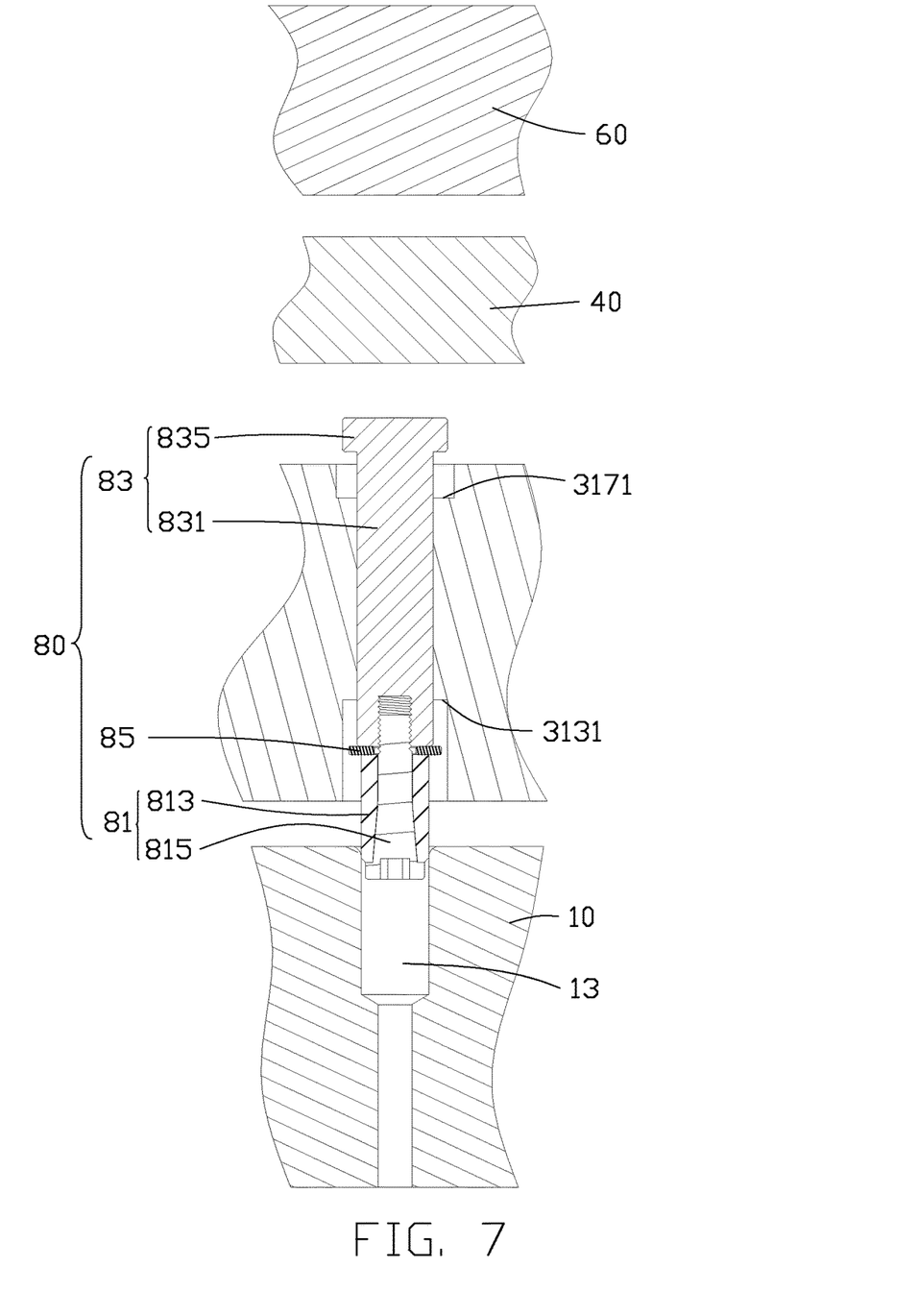
FIG. 7 is a partial cross-sectional view of the mold shown in FIG. 1 for a state that the locking device extending into the receiving hole more deeply during closing the mold.

The second mold plate 30 can be positioned on the first mold plate 10 and clamped with the first mold plate 10 together by a locking device 80. A through hole 31 can be defined in the second mold plate 30 corresponding to the receiving hole 13. The through hole 31 can include a first retaining portion 313, a second retaining portion 315, and a third retaining portion 317. The first retaining portion 313, the second retaining portion 315, and the third retaining portion 317 can be flow communicating with each other in that order. A diameter D1 of the first retaining portion 313 can be greater than a diameter D2 of the second retaining portion 315, the diameter D2 of the second retaining portion 315 can be less than a diameter D3 of the third retaining portion 317, such that a limiting surface 3131 (as FIG. 2 shown) can be formed between the first retaining portion 313 and the second retaining portion 315, and a resisting surface 3171 can be formed between the second retaining portion 315 and the third retaining portion 317 (as FIG. 7 shown). A mounting hole 35 (shown in FIG. 1) can be formed on a surface of the second mold plate 30 adjacent to the stripper plate 40 and spaced from the through hole 31.

The second mold plate 30, the stripper plate 40, and the top plate 60 can be detachably assembled together via the lever assembly 90. The top plate 60 can be a fixed bolstened plate, which can be fixed on a top of the injection molding machine. The stripper plate 40 can be arranged between the top plate 60 and the second mold plate 30. A stepped-shaped installation hole 61 can be formed in the top plate 60.

Figure 3:
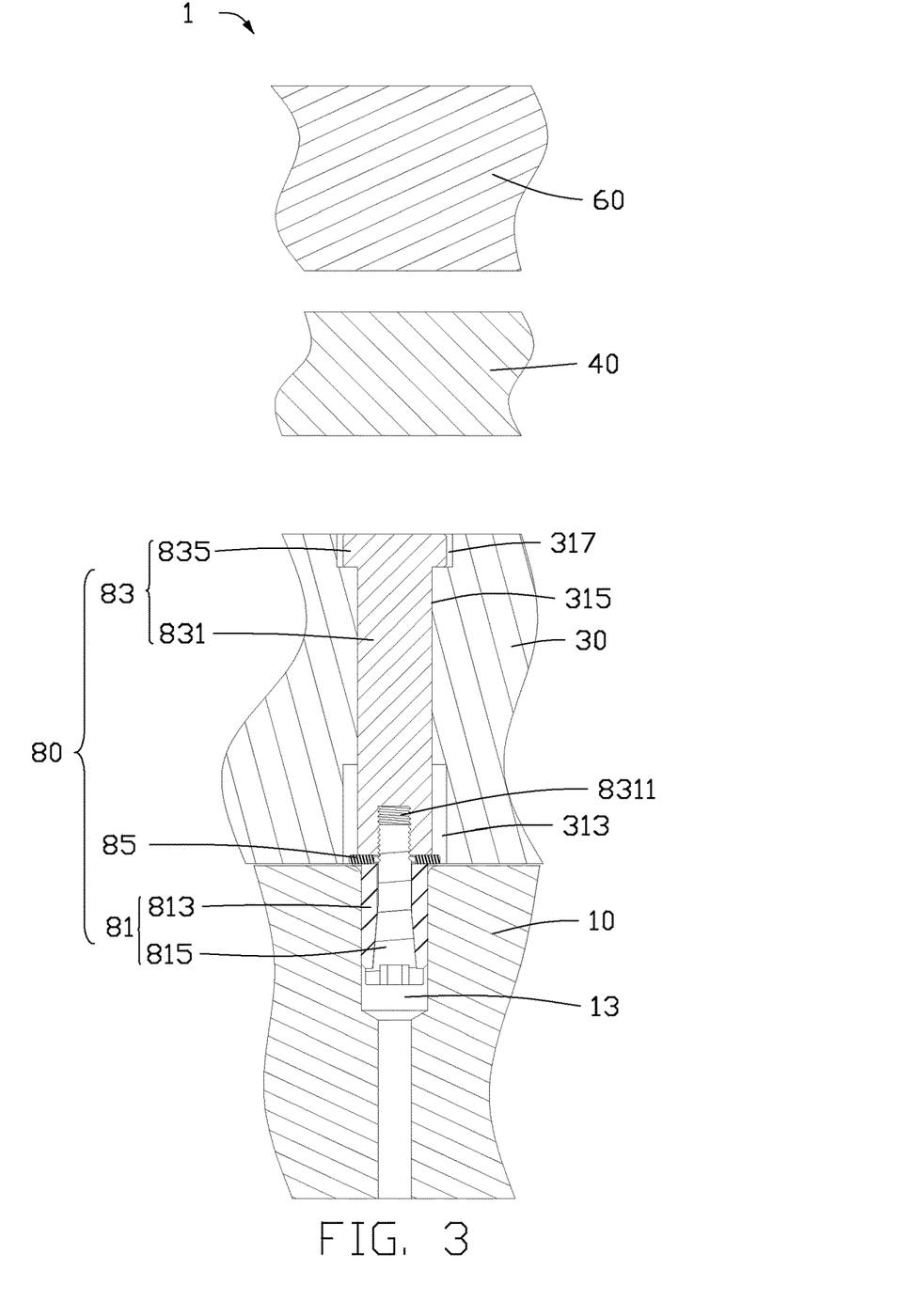
FIG. 3 is a partial cross-sectional view of the mold shown in FIG. 1 for a state that the stripper plate being detached from the top plate during opening the mold.

The locking device 80 can be movably received in the receiving hole 13 and the through hole 31. The locking device 80 can include a locking member 81, a guiding rod 83, and a space member 85. The locking member 81 can be received in the receiving hole 13 and resisting with a sidewall of the receiving hole 13. Referring to FIG. 2, the locking member 81 can include a bushing 813 and a taper bolt 815. The taper bolt 815 can be received in the bushing 813 at one end and another one end of the taper bolt 815 can be fixedly coupled to the guiding rod 83. In the illustrated embodiment, the locking member 81 can be a parting lock, and the bushing 813 can be made of nylon. The guiding rod 83 can be movably received in the receiving hole 31. The guiding rod 83 can include a first guiding portion 831 and a second guiding portion 835 coupling with the first guiding portion 831. A fixing hole 8311 (as shown in FIG. 3) can be defined in an end of the first guiding portion 831 away from the second guiding portion 835. The end of the taper bolt 815 exposed of the bushing 813 can be fixedly mounted in the fixing hole 8311.

The lever assembly 90 can include a pulling rod 91 and an elastic member 93. The pulling rod 91 can movably pass through the first mold plate 10, the mounting hole 35 of the second mold plate 30, the stripper plate 40, and the installation hole 61, for detachably assembling with the first mold plate 10, the second mold plate 30, the stripper plate 40, and the top plate 60 together. The elastic member 93 can sleeve on the pulling rod 91 and received in the mounting hole 35. The elastic member 93 can resisted between the stripper plate 40 and a bottom of the mounting hole 35. The lever assembly 90 can further include a connecting member 95. The connecting member 95 can be movably received in the installation hole 61. The pulling rod 91 can passes through the connecting member 95 and fixed with the connecting member 95. The connecting member 95 can be moved in the installation hole 61 by the pulling rod 91.

Referring to FIG. 2, a diameter D4 of the second guiding portion 835 can be greater than a diameter of the first guiding portion 831 and the diameter D2 of the second retaining portion 315. A height of the second guiding portion 835 can be equal to or less than a height of the third retaining portion 317. The space member 85 can be located between the guiding rod 83 and the bushing 813. A diameter D5 of the space member 85 can be less than the diameter D1 of the first retaining portion 313 but greater than the diameter D2 of the second retaining portion 315, for preventing the locking member 81 entering the second retaining portion 315. In the illustrated embodiment, a friction between the bushing 813 and the mold plate 10 is greater than a friction between the guiding rod 83 and the second mold plate 30.

Figure 4:
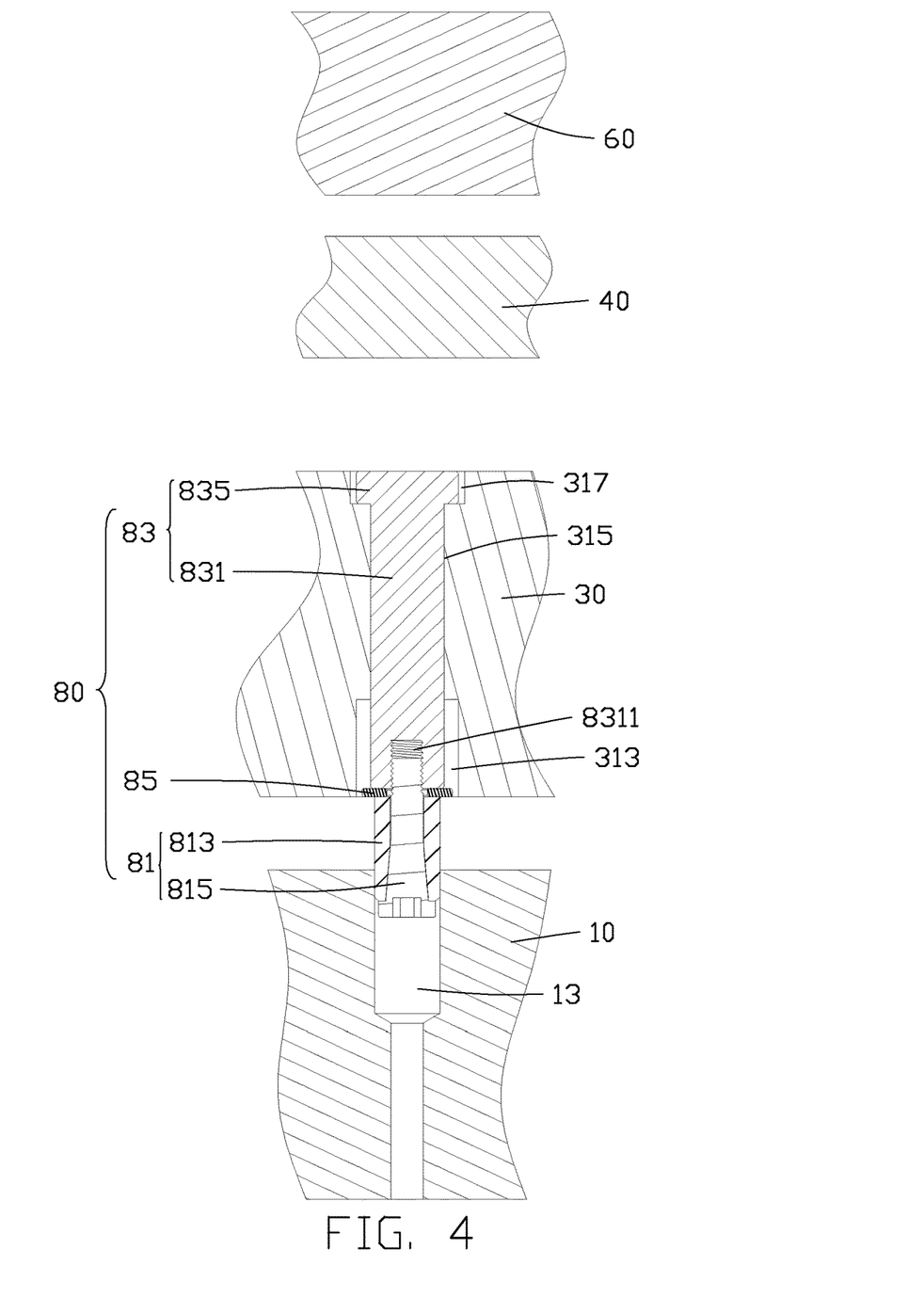
FIG. 4 is a partial cross-sectional view of the mold shown in FIG. 1 for a state that the first mold plate being detached from the second mold plate during opening the mold.
Figure 5:
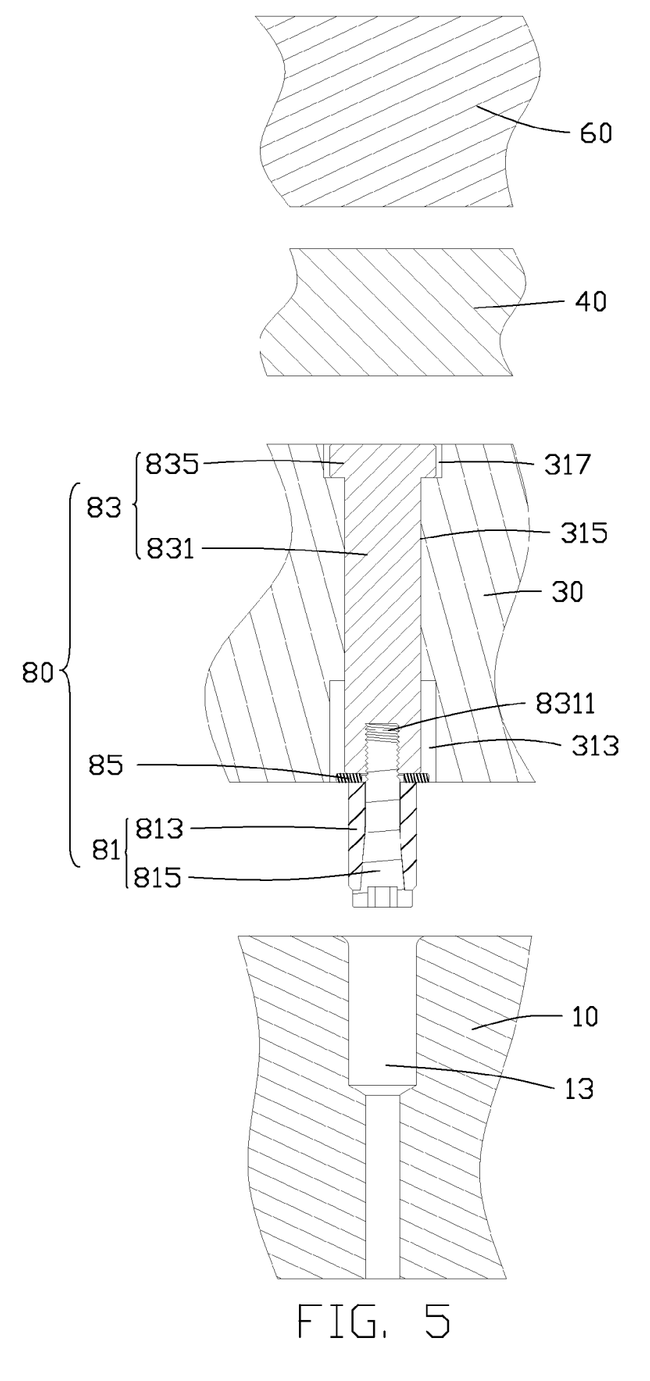
FIG. 5 is a partial cross-sectional view of the mold shown in FIG. 1 for a state that the locking device being detached from the first mold plate during opening the mold.

In a mold opening operation, the first mold plate 10 can be moved towards a direction away from the top plate 60. Referring to FIG. 2, the second mold plate 30 can be moved together with the first mold plate 10, because of a friction between the bushing 813 and the first mold plate 10, the stripper plate 40 can be detached from the second mold plate 30 caused by an effort of the elastic member 93. As shown in FIG. 3, the first mold plate 10 can keep moving together with the second mold plate 30, the stripper plate 40 can be detached from the top plate 60 when a force of the elastic member 93 decreases enough or is eliminated. The first mold plate 10 can be detached from the second mold plate 30 (as FIG. 4 shown), when an increased force is greater than the friction between the bushing 813 and the first mold plate 10, and the locking member 81 can be exposed out of the receiving hole 13. As shown in FIG. 5, the locking member 81 can be totally out of the receiving hole 13, and the locking device 80 can be detached from the first mold plate 10.

Figure 6:
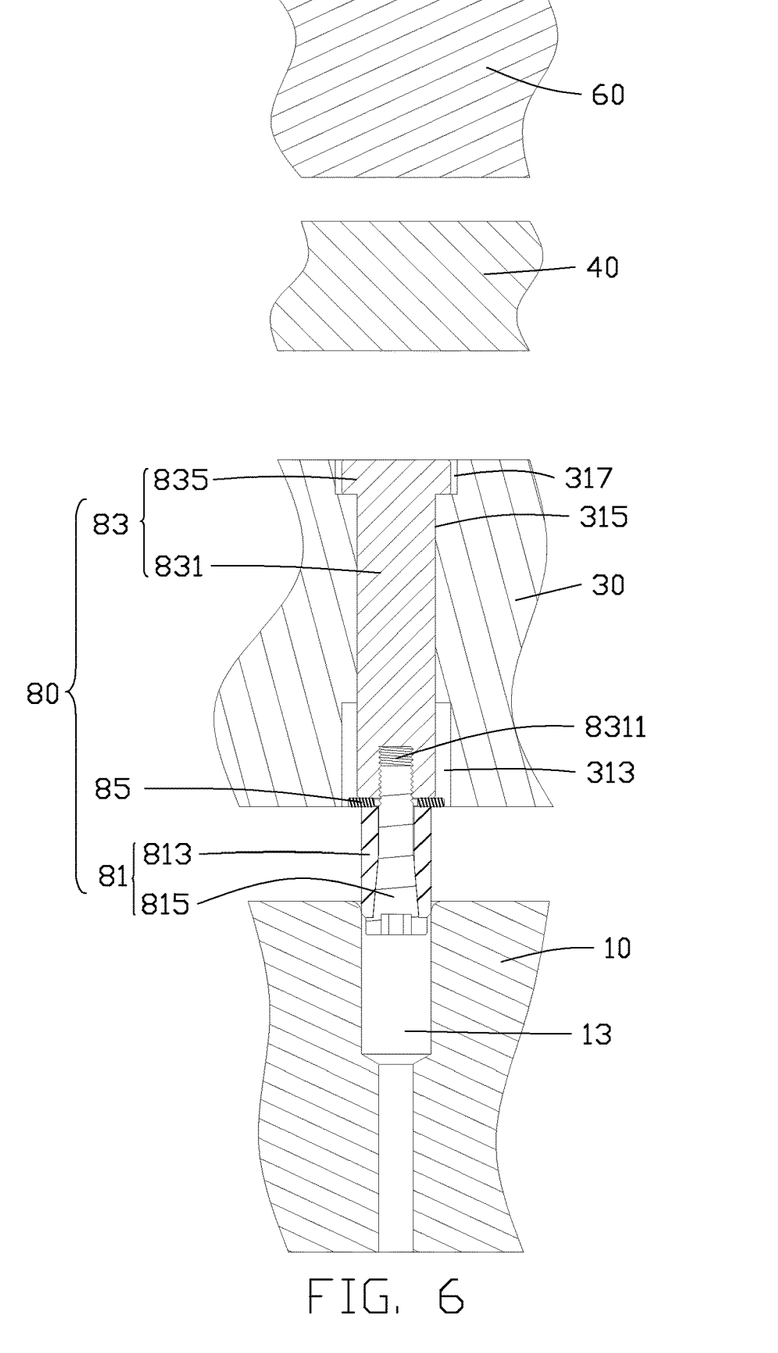
FIG. 6 is a partial cross-sectional view of the mold shown in FIG. 1 for a state that the locking device extending into a receiving hole of the first mold plate during closing the mold.
Figure 8:
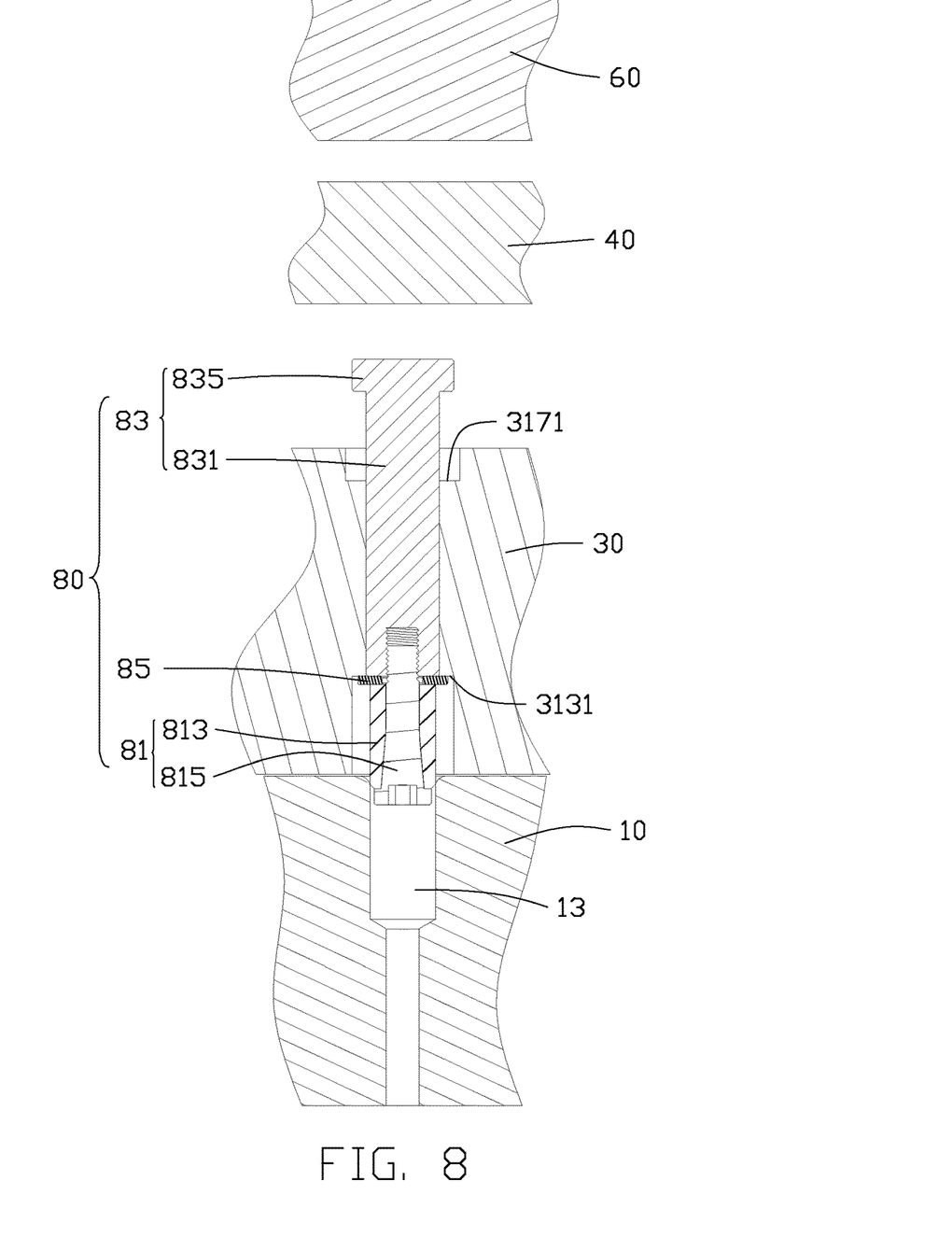
FIG. 8 is a partial cross-sectional view of the mold shown in FIG. 1 for a state that a space member of the locking device contacting with the limiting surface of the second mold plate during closing the mold.

In a mold closing operation, referring to FIGS. 6 to 12, the first mold plate 10 can be moved towards the second mold plate 30, the locking member 81 can extend into the receiving hole 13, and the bushing 813 can contact the sidewall of the receiving hole 13 (as FIG. 6 shown). The locking device 80 can be pushed to move in the through hole 31 towards the stripper plate 40, because of the friction between the bushing 813 and the first mold plate 10. Referring to FIG. 7, the locking device 80 can extend into the receiving hole 13 more deeply. The space member 85 can contact with the limiting surface 3131 (as FIG. 8 shown) when the first mold plate 10 closing with the second mold plate 30, a partial portion of the guiding rod 83 can be exposed out of the through hole 31. The first mold plate 10 and the second mold plate 30 can be kept moving, and an end of the guiding rod 83 away from the first mold plate 10 can contact with the stripper plate 40

Figure 9:
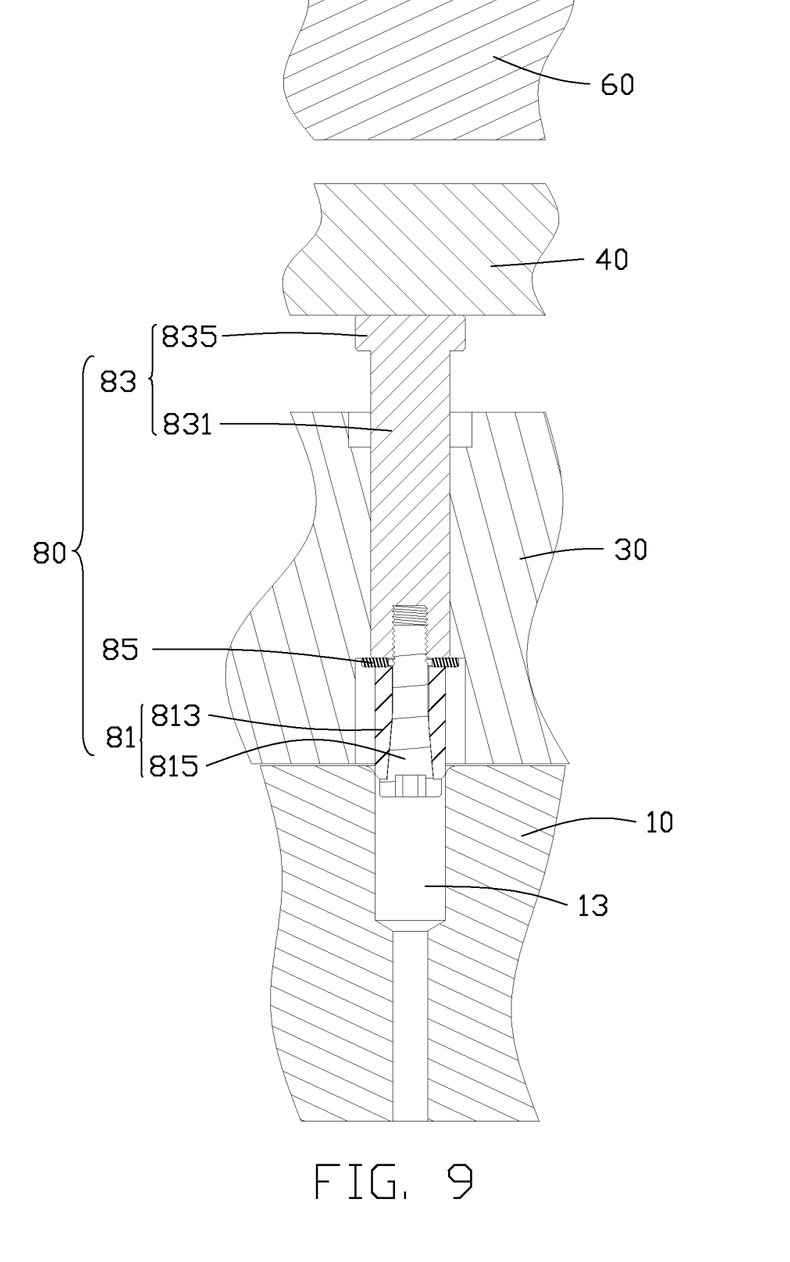
FIG. 9 is a partial cross-sectional view of the mold shown in FIG. 1 for a state that a guiding rod of the locking device contacting with the stripper plate during closing the mold.
Figure 10:
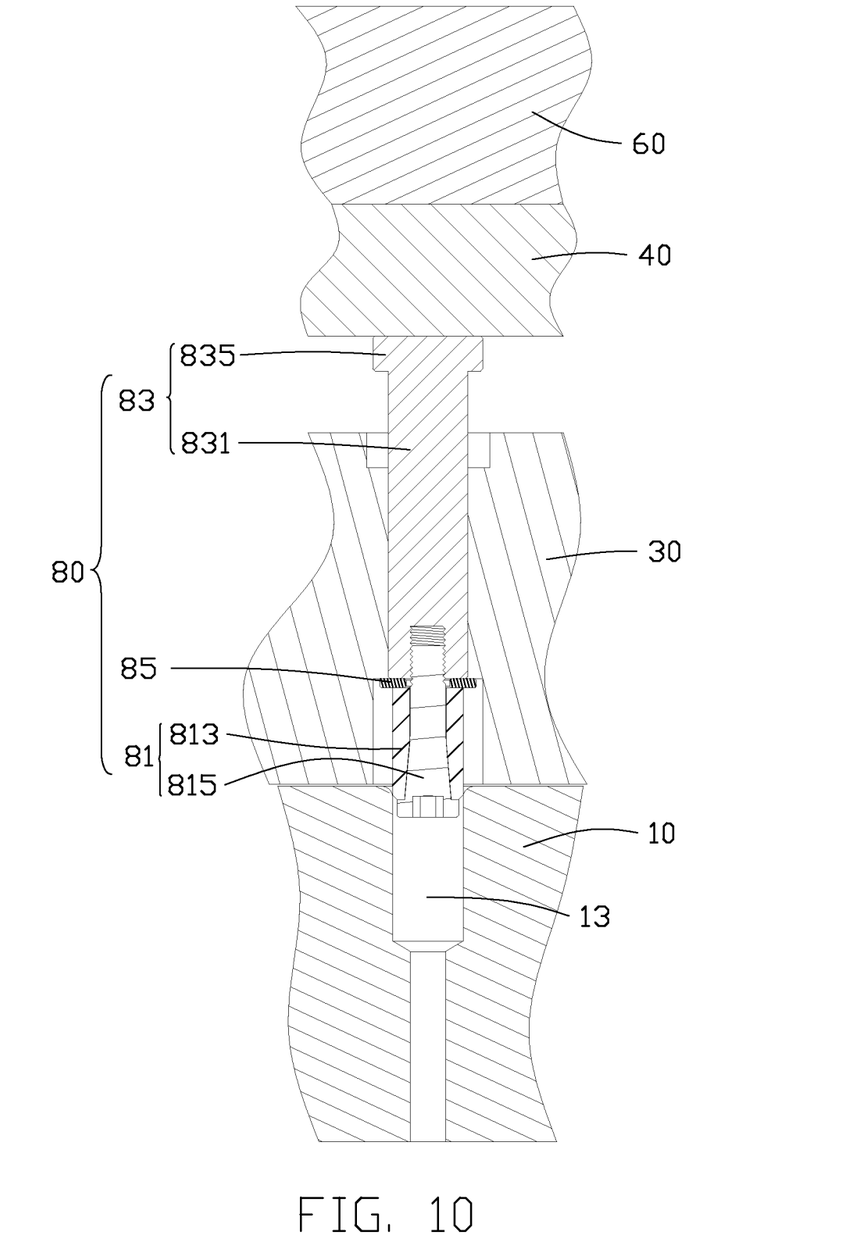
FIG. 10 is a partial cross-sectional view of the mold shown in FIG. 1 for a state that the top plate and the stripper plate being closed together during closing the mold.
Figure 11:
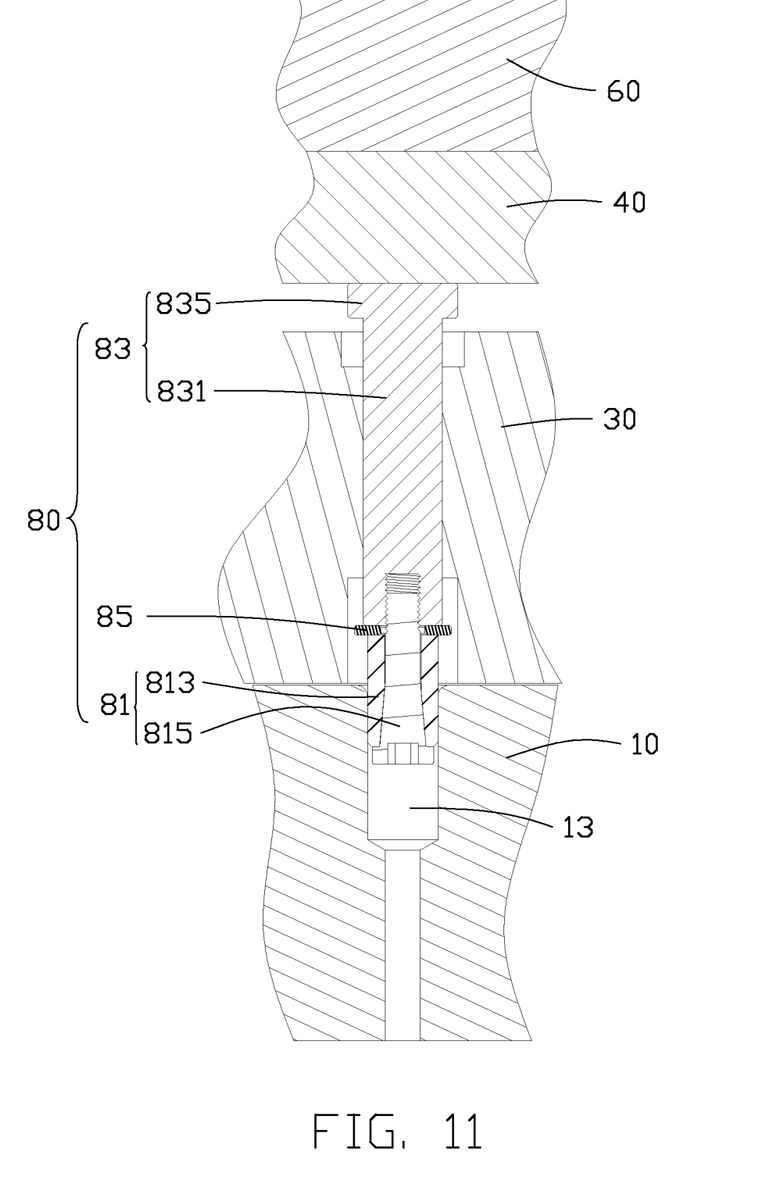
FIG. 11 is a partial cross-sectional view of the mold shown in FIG. 1 for a state that the first mold plate and the second mold plate keeping moving after closing the stripper plate and the top plate during closing the mold.
Figure 12:
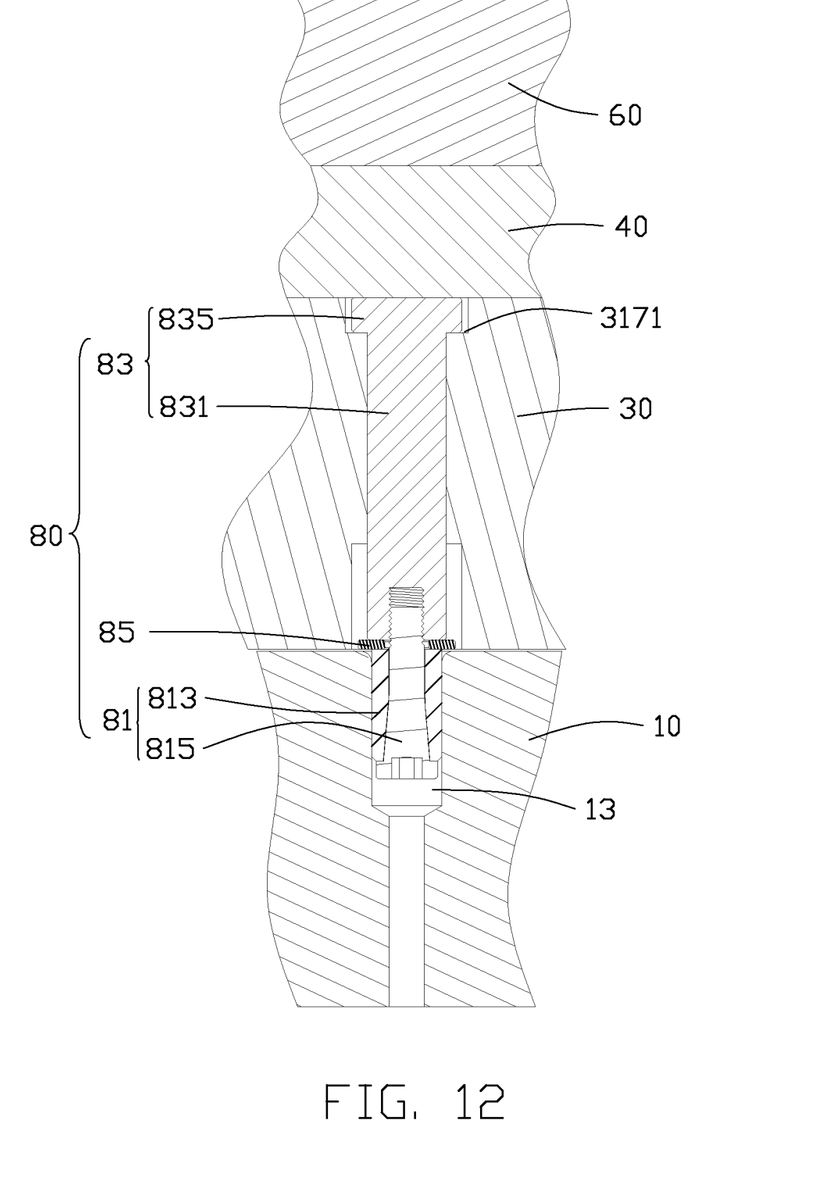
FIG. 12 is a partial cross-sectional view of the mold shown in FIG. 1 for a state that a second guiding portion of the locking device contacting with a resisting surface of the second mold plate during closing the mold.

(as FIG. 9 shown). Referring to FIG. 10, the top plate 60 and the stripper plate 40 can be closed together by an effort of the guiding rod 8. Referring to FIG. 11, the first mold plate 10 and the second mold plate 30 can be kept moving after closing the stripper plate 40 and the top plate 60. Referring to FIG. 12, the locking device 80 can move in the through hole 31 until the second guiding portion 835 contacts with the resisting surface 3171, the locking member 81 can be received in the receiving hole 13, and the stripper plate 40 closes with the second mold plate 30.

In the at least one embodiment, the through hole 31 can omit the third retaining portion 317, the guiding rod 83 can omit the second guiding portion 835, the second mold plate 30 can move together with the first mold plate 10 if a friction between the guiding rod 83 and the second mold plate 30 is big enough, and the friction between the guiding rod 83 and the second mold plate 30 is less than the locking member 81.

Figure 13:
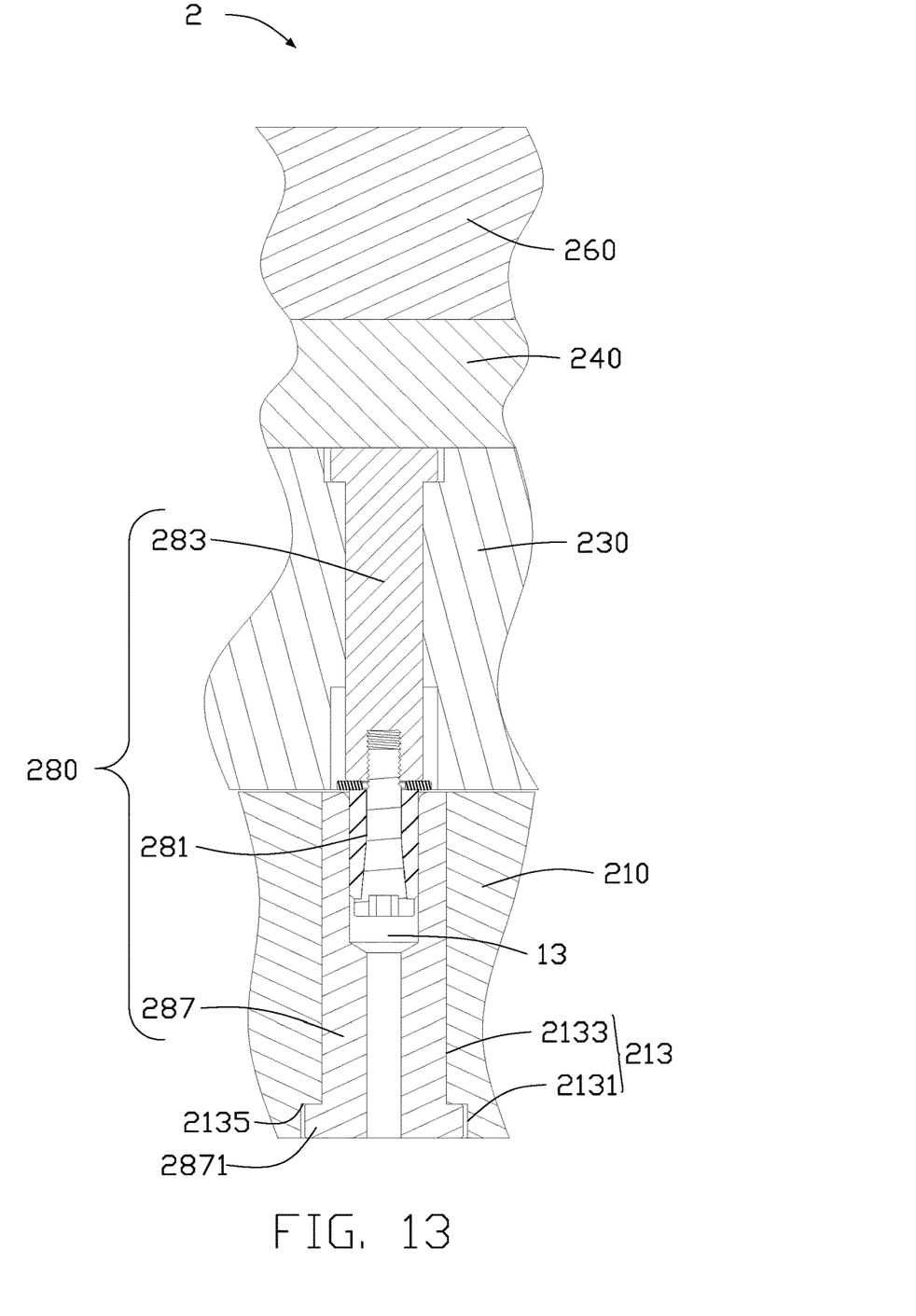
FIG. 13 is a partial cross-sectional view of a second embodiment of a mold.

Referring to FIG. 13, a second embodiment of mold 2 is shown. A structure of the mold 2 and the structure of the mold 1 is similar, but with a difference that the locking device 280 further including a sleeve 287 for adjusting an opening distance in an opening process. The sleeve 287 can be received in the receiving hole 213. The receiving hole 213 can be a stepped hole including a first connecting portion 2131 and a second connecting portion 2133 flow communicating with the first connecting portion 2131. The second connecting portion 2133 can be positioned adjacent to the second mold plate 230. A diameter of the first connecting portion 2131 can be greater than a diameter of the second connecting portion 2133 to form a stepped surface 2135. A flange portion 2871 can be formed on a bottom of the sleeve 287, and a diameter of the flange portion 2871 can be greater than the diameter of second connecting portion 2133. A height of the flange portion 2871 can be equal to a height of the first connecting portion 2131 for preventing a motion of the sleeve 287 together with a locking member 281.

Figure 14:
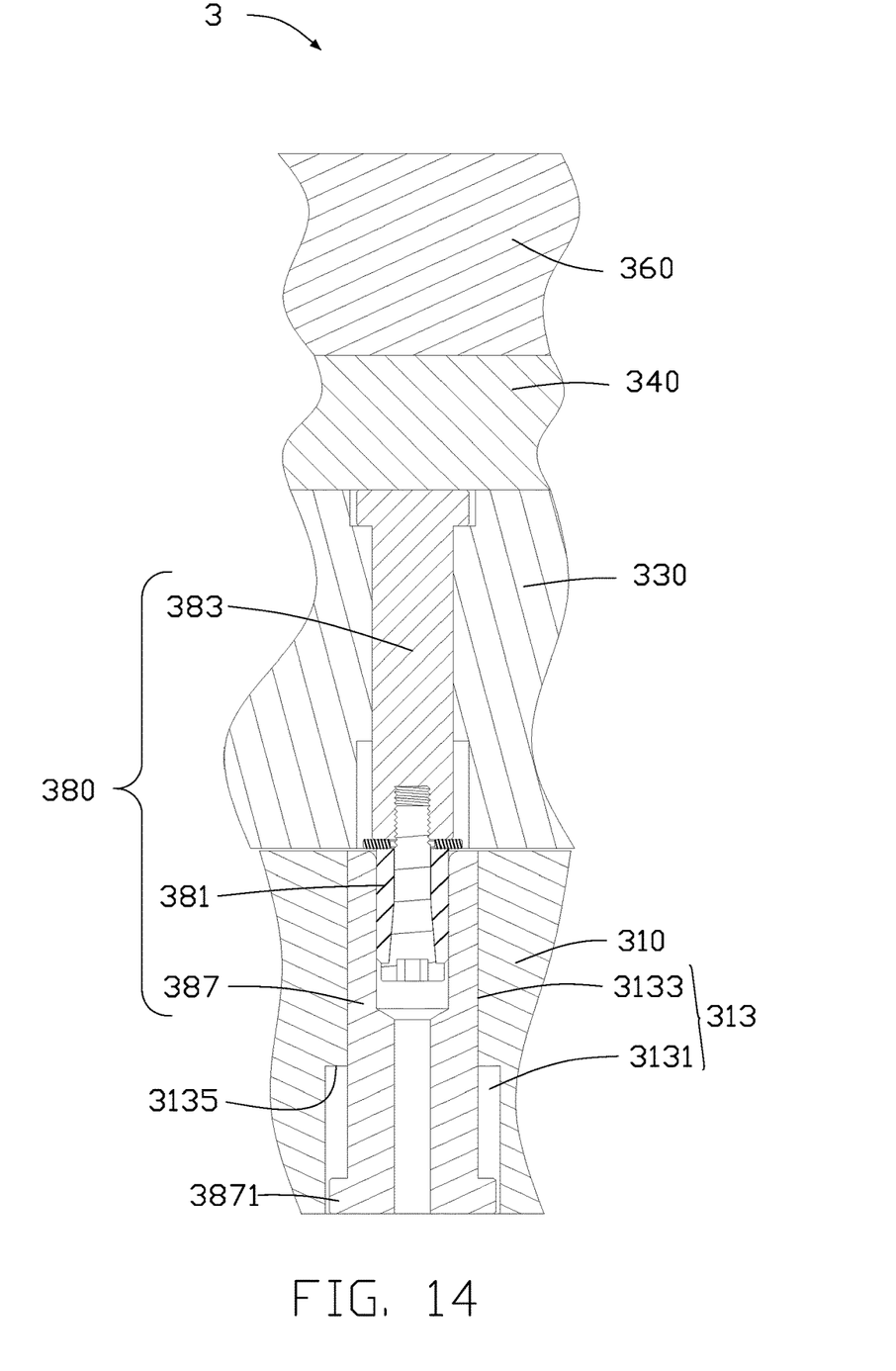
FIG. 14 is a partial cross-sectional view of a third embodiment of a mold.

Referring to FIG. 14, a third embodiment of mold 3 is shown. A structure of the mold 3 and the structure of the mold 1 is similar, but with a difference that the locking device 380 further including a sleeve 387 for adjusting an opening distance in an opening process. The sleeve 387 can be received in the receiving hole 313. The receiving hole 313 can be a stepped hole including a first connecting portion 3131 and a second connecting portion 3133 flow communicating with the first connecting portion 3131. The second connecting portion 3133 can be positioned adjacent to the second mold plate 330. A diameter of the first connecting portion 3131 can be greater than a diameter of the second connecting portion 3133 to form a stepped surface 3135. A flange portion 3871 can be formed on a bottom of the sleeve 387, and a diameter of the flange portion 3871 can be greater the diameter of second connecting portion 3133. A height of the flange portion 3871 can be less than a height of the first connecting portion 3131 for preventing a motion of the sleeve 387 together with an locking member 381.

The embodiments shown and described above are only examples. Many details are often found in the art such as the other features of an locking device and a mold using the locking device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mold comprising:
a first mold plate defining a receiving hole;
a second mold plate clamped to the first mold plate and defining a through hole corresponding to the receiving hole, the through hole comprising a first retaining portion and a second retaining portion coupled to the first retaining portion, wherein the first retaining portion is located adjacent to the first mold plate and the first retaining portion having a diameter being greater than a diameter of the second retaining portion;
a stripper plate positioned adjacent to the second mold plate and away from the first mold plate, wherein the second mold plate positioned between the stripper plate and the first mold plate;
a top plate coupled to the stripper plate away from the second mold plate, the stripper plate positioned between the top plate and the stripper plate;
a locking device movably passing through the first mold plate and the second mold plate, the locking device comprising:
a locking member movably received in the receiving hole, the locking member resisting with a sidewall of the receiving hole and a friction generated between the locking member and the sidewall of the receiving hole preventing the locking member from moving relative to the first mold plate;
a guiding rod coupled to the locking member with one end, the guiding rod passing through the first retaining portion and the second retaining portion away from the locking member;
a space member sleeved on the locking member and positioned adjacent to the guiding rod, wherein the space member having a diameter that is smaller than the diameter of the first retaining portion but greater than the diameter of the second retaining portion; and
a lever assembly movably passing through the first mold plate, the second mold plate, the stripper plate, and the top plate;
wherein when the first mold plate is moved towards the second mold plate, the locking member and the guiding rod move towards the top plate; when in a mold closing operation, the first mold plate and the second mold plate move until the space member contacts an end wall of the first retaining portion, such that a partial portion of the guiding rod is exposed out of the through hole to push the stripper plate close to the top plate.

2. The mold of claim 1, wherein the guiding rod comprises a first guiding portion and a second guiding portion coupling with the first guiding portion, the through hole further comprises a third retaining portion flow communicating with the second guiding portion, the second retaining portion is located between the first retaining portion and the third retaining portion, a diameter of the third retaining portion is greater than the diameter of the second retaining portion, the first guiding portion is fixed with the locking member, a diameter of the second guiding portion is greater than the diameter of the first guiding portion and the diameter of the second retaining portion, the first guiding portion movably passes through the second retaining portion, the second guiding portion is movably received in the third retaining portion.

3. The mold of claim 1, wherein the locking device further comprises a sleeve, the sleeve is received in the receiving hole and resists with the sidewall of the receiving hole, the locking member is movably received in the sleeve and resists with an inside-wall of the sleeve.

4. The mold of claim 3, wherein the receiving hole is a stepped hole comprising a first connecting portion and a second connecting portion flow communicating with the first connecting portion, the second connecting portion is positioned adjacent to the second mold plate, a diameter of the first connecting portion is greater than a diameter of the second connecting portion to form a stepped surface, a flange portion is formed on a bottom of the sleeve, a diameter of the flange portion is greater the diameter of second connecting portion, a height of the flange portion is less than or equal to a height of the first connecting portion.

5. The mold of claim 1, wherein the lever assembly comprises a pulling rod and an elastic member, the second mold plate defines a mounting hole adjacent to the stripper plate and spaced from the through hole, the pulling rod passes through the first mold plate, the second mold plate, the stripper plate, and the top plate, the elastic member is sleeved on the pulling rod and received in the mounting hole.

6. The mold of claim 1, wherein the locking member comprises a bushing and a taper bolt, the bushing is movably received in the receiving hole and resists with the sidewall of the receiving hole, the taper bolt is received in the bushing at one end and another one end of the taper bolt is fixedly coupled to the guiding rod, the space member is located between the guiding rod and the bushing.

7. The mold of claim 1, wherein the locking member is a parting lock.

8. The mold of claim 1, wherein a round angle is formed on a sidewall of the receiving hole adjacent to the second mold plate for preventing the locking device from damage.

9. A locking device for a mold, the mold comprising a first mold plate, a second mold plate, a stripper plate, and a top plate, the first mold plate, the second mold plate, the stripper plate, and the top plate being detachably assembled together in sequence, the locking device comprising:
  a locking member movably received in a receiving hole of a first mold plate of the mold, the locking member resisting with a sidewall of the receiving hole and a friction generated between the locking member and the sidewall of the receiving hole preventing the locking member from moving relative to the first mold plate;
  a guiding rod coupled to the locking member with one end, the guiding rod passing through a through hole of a second mold plate of the mold corresponding to the receiving hole, the through hole comprising a first retaining portion and a second retaining portion flow communicating with the first retaining portion; and
  a space member sleeved on the locking member and positioned adjacent to the guiding rod, a diameter of the space member being less than the first retaining portion but greater than the diameter of the second retaining portion,
  wherein the first mold plate is moved towards the second mold plate, the locking member and the guiding rod are brought to move towards the top plate when in a mold closing operation, the first mold plate and the second mold plate keep moving until the space member contacting an end wall of the first retaining portion, such that a partial portion of the guiding rod is exposed out of the through hole to push the stripper plate closing with the top plate.

10. The locking device of claim 9, wherein the locking device further comprises a sleeve, the sleeve is configured to be received in the receiving hole and to resist with the sidewall of the receiving hole, the locking member is movably received in the sleeve and resists with an inside-wall of the sleeve.

11. The locking device of claim 10, wherein a flange portion is formed on a bottom of the sleeve.

12. The locking device of claim 9, wherein the guiding rod comprises a first guiding portion and a second guiding portion coupling with the first guiding portion, a diameter of the second guiding portion is greater than a diameter of the first guiding portion and the second retaining portion, the first guiding portion movably passes through the second retaining portion, the second guiding portion is configure to be movably received in a third retaining portion of the through hole flow communicating with the second retaining portion.

13. The locking device of claim 9, wherein the locking member comprises a bushing and a taper bolt, the bushing is movably received in the receiving hole and resists with the sidewall of the receiving hole, the taper bolt is received in the bushing at one end and another one end of the taper bolt is fixedly coupled to the guiding rod, the space member is located between the guiding rod and the bushing.

* * * * *